United States Patent

[11] 3,633,036

[72] Inventor Joe A. Nuckolls
  Hendersonville, N.C.
[21] Appl. No. 725,572
[22] Filed Apr. 16, 1968
[45] Patented Jan. 4, 1972
[73] Assignee General Electric Company
  Continuation-in-part of application Ser. No.
  633,980, Apr. 26, 1967, now abandoned.
  This application Apr. 16, 1968, Ser. No.
  725,572

[54] CONTROL CIRCUIT WITH CONTROLLED SEMICONDUCTOR AND INTEGRATING SWITCH MEANS
  11 Claims, 5 Drawing Figs.

[52] U.S. Cl. .................................................. 250/214 R, 315/159
[51] Int. Cl. ............................................................ H01j 39/12
[50] Field of Search .............................................. 315/159, 156; 250/214, 209; 307/311; 337/71

[56] References Cited
UNITED STATES PATENTS

| | | | |
|---|---|---|---|
| 3,328,606 | 6/1967 | Pinckaers | 307/88.5 |
| 3,351,762 | 11/1967 | Adkin et al. | 315/159 X |
| 3,381,169 | 4/1968 | Brock et al. | 315/159 X |
| 3,421,005 | 1/1969 | Baker | 315/159 X |
| 3,428,861 | 2/1969 | Zinsmeyer | 315/159 X |
| 3,450,939 | 6/1969 | Misencik | 315/159 X |
| 3,240,960 | 3/1966 | Woodward | 307/117 |
| 3,421,013 | 1/1969 | Angelari | 315/156 X |

FOREIGN PATENTS

| | | | |
|---|---|---|---|
| 201,974 | 5/1955 | Australia | 315/159 |

OTHER REFERENCES
SCR Manual, General Electric Co., Third Ed. Mar. 23, 1964.

Primary Examiner—James W. Lawrence
Assistant Examiner—D. C. Nelms
Attorneys—Sidney Greenberg, Frank L. Neuhauser, Oscar B. Waddell and Melvin M. Goldenberg ABSTRACT: Control device for switching loads on and off, such as street lights, in response to ambient light levels comprises a photoelectric cell which has a variable resistance depending upon the intensity of incident light rays, a controlled rectifier which serves as a switch in response to the operation of the photoelectric cell, and an integrating switch such as a thermal switch operating in response to the controlled rectifier for turning the load on and off.

Inventor,
Joe A. Nuckolls,
by Sidney Greenberg
His Attorney.

Inventor,
Joe A. Nuckolls,
by Sidney Greenberg
His Attorney.

3,633,036

CONTROL CIRCUIT WITH CONTROLLED SEMICONDUCTOR AND INTEGRATING SWITCH MEANS

The present application is a continuation-in-part of copending application, Ser. No. 633,980 filed Apr. 26, 1967, now abandoned, and assigned to the same assignee as the present application.

It is a general object of the invention to provide improved control devices for operating electrical systems in response to variations in ambient or environmental conditions or to the operation of various types of apparatus.

It is a particular object of the invention to provide control devices of the above type having integrating switch means, especially thermally operated switch means.

Another particular object of the invention is to provide a control device of the above type which can reliably handle heavy loads while utilizing a detecting or sensing element, such as a photosensitive cell, which is subjected to low-duty cycles.

It is another specific object of the invention to provide a control device of the above type which compensates for variations in ambient temperature and other conditions adversely affecting its operation; and which may be operated from power supply sources of various voltage levels.

A further object of the invention is to provide a control device of the above type which is stable in operation, compact and simple in form, and economical to manufacture.

Other objects and advantages will become apparent from the following description and the appended claims.

With the above objects in view, the present invention, in a broad aspect, relates to a control device for controlling the operation of a load comprising, in combination, electric current supply means, controlled semiconductor means connected across the electric current supply means and having a control electrode adapted to be actuated for rendering the controlled semiconductor means conductive to current from the supply means, sensing means connected to the supply means and to the control electrode of the controlled semiconductor means, the sensing means being operable to conduct current in response to predetermined conditions in its environment and thereby actuating the control electrode, and integrating switch means in series with the controlled semiconductor means and the supply means for integrating the output of the controlled semiconductor means and for operating the load in response thereto.

In a particular embodiment of the invention, the sensing means comprises a photoelectric cell, and the integrating switch means comprises a heating resistor in series with the controlled semiconductor means and a thermal switch exposed to the heat produced by the heating resistor.

The invention will be better understood from the following description taken in conjunction with the accompanying drawings, in which.

Figure 1:
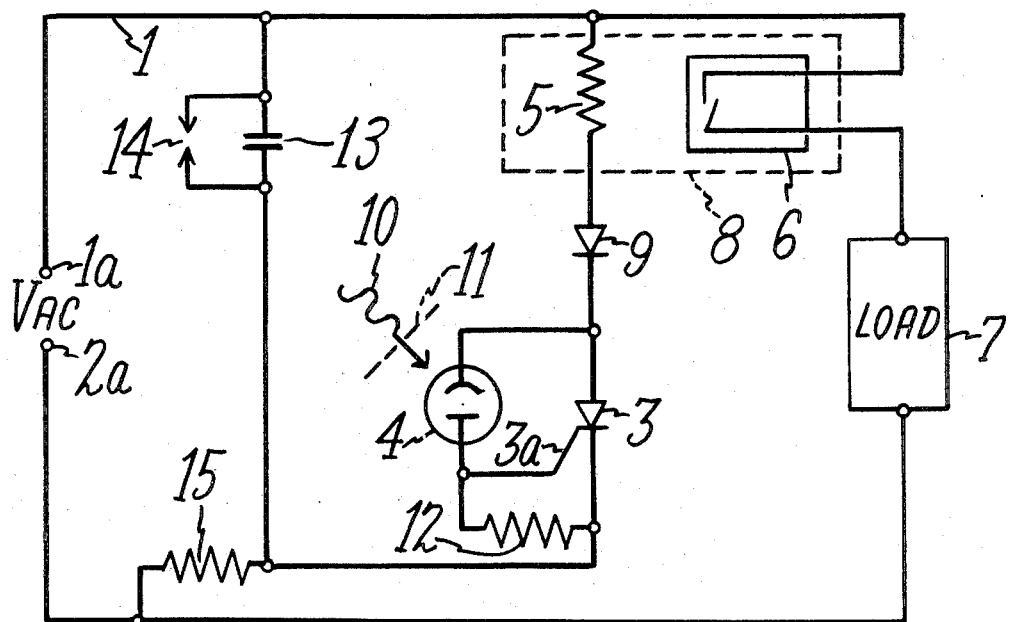
FIG. 1 is a circuit diagram of a photoelectric control device constructed in accordance with the invention and including a controlled rectifier means.

Referring now to the drawings, and particularly to FIG. 1, there is shown a photoelectric control device connected to supply lines 1 and 2 having terminals 1a, 2a for connection to an alternating current supply. Connected across supply lines 1, 2 is a controlled rectifier 3, such as a silicon controlled rectifier (SCR), having a control (gate) electrode 3a and being connected in series with heating resistor 5. Thermal switch 6 is arranged in proximity to, i.e., in thermal contact with, heating resistor 5 in an enclosure 8 and is connected in series with load 7 connected to supply lines 1, 2. In a typical application of the control device, load 7 is a street lighting luminaire. Although the circuit comprising thermal switch 6 and load 7 are shown connected to supply lines 1, 2, it will be understood that this circuit, as well as the load circuits in the other arrangements shown in the drawings, may alternatively be connected to other power sources if desired.

Connected across SCR 3 via control electrode 3a is photoelectric cell 4, such as a variable resistance cadmium sulfide cell of known type, which is arranged exposed to ambient light rays 10. Adjustable shade 11 interposed between photoelectric cell 4 and the source of light serves to selectively establish the intensity of ambient light which actuates photoelectric cell 4, as desired. Diode 9 arranged in series with the parallel-connected photoelectric cell 4 and SCR 3 serves to limit the photoelectric cell duty to only unidirectional half-cycles and to protect SCR 3 against reverse voltage effects. Resistor 12 connected between the cathode of SCR 3 and its control electrode 3a serves to assist SCR 3 in holding off forward blocking voltage when ungated, that is, to prevent self-firing of the SCR in the event of forward-biased voltage induced current leakage, and to provide a gate voltage firing threshold, in contrast to a gate current firing threshold which is more sensitive to ambient temperature excursions.

Surge and transient voltage protection for the circuit is provided by parallel-connected capacitor 13 and spark gap 14 which are arranged in shunt with the above-described circuit components and in series with resistor 15. In the arrangement, capacitor 13 effectively short circuits high-frequency voltage transients, and spark gap 14 clamps power voltage surges of longer duration as the series resistor 15 provides the series voltage dropping element across which the transients and surges appear.

Although not shown, a suitable voltage limiting device such as a varistor, Zener element, or the like, may be connected in shunt with the SCR–photoelectric cell circuit where such provision is necessary or desirable.

In the use of the described device for operating street lighting luminaires, the contacts of thermal switch 6 are normally closed during the hours of darkness, since during this period the resistance of photoelectric cell 4 is high and little or no current passes through resistor 5 or SCR 3. As the intensity of light rays 10 increases at dawn, the incidence of such light on photoelectric cell 4 decreases its resistance, with the result that current passes therethrough to control electrode 3a of SCR 3. The latter is thus actuated, and in the initial stage its firing is somewhat sporadic due to the variation in resistance of photoelectric cell 4 at the threshold of light level at this stage. Heating resistor 5, by its heating effect, integrates the sporadic current thus initially produced and eventually generates heat at a sufficiently high level to open the contacts of thermal switch 6, thereby turning luminaire 7 off. At dusk, the reverse process takes place, wherein the resistance of photoelectric cell 4 increases until no actuating current flows to control electrode 3a so that SCR 3 blocks current flow to heating resistor 5, and thermal switch 6 then cools off sufficiently to permit its contacts to close and thereby switch luminaire 7 on. Once thermal switch 6 has closed or opened, its thermal lag or differential is adequate to hold it in that position until a substantial variation in temperature occurs to change its position. The time required for closing and opening thermal switch 6 may, of course, be varied as desired by selection of an appropriate heating resistor 5 or thermal switch 6 having the desired heating or response characteristics.

The thermal switch 6 used in this or any of the other disclosed circuits may be any of several which are commercially available. A particular type which has proved satisfactory is one incorporating a Spencer bimetal disc which has an effective snap-action. This device exhibits long life while switching heavy loads, such as 1,000 watt incandescent lamps or 1,800 volt-ampere inductive loads.

Figure 2:
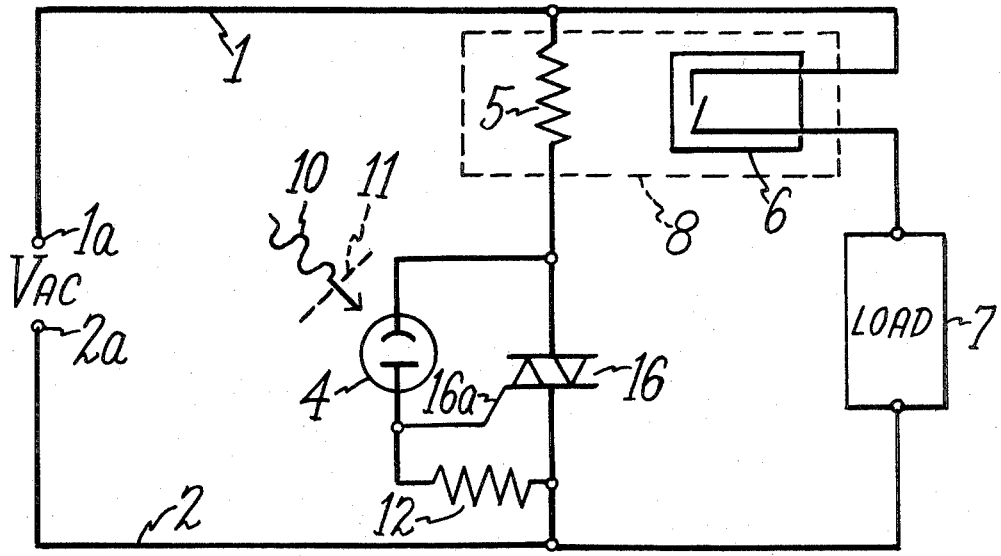
FIG. 2 shows a modification of the FIG. 1 circuit in which a symmetrical controlled semiconductor means is employed.

FIG. 2 shows a modified circuit in which a symmetrical semiconductor switch 16, such as a triac, is used in place of the silicon controlled rectifier 3 of the FIG. 1 circuit. A "- triac" is an alternating current semiconductor controlled switch having a single control electrode which, when gated, causes the switch to conduct current in the direction as indicated by the forward bias condition of the semiconductor. A triac may also be described as a bidirectional triode for gate control of alternating current power. Conduction of alternating current through photoelectric cell 4 triggers triac 16 for conduction alternately in each direction. Since only non-catastrophic forward breakover can occur in the triac, the need for surge and transient voltage protection may be largely dispensed with. Further, since this device now utilizes the full sine wave of the applied voltage, a rectifier such as diode 9 is no longer employed, and full wave heating of resistor 5 is thereby provided.

Instead of a triac, an arrangement of parallel-connected, oppositely poled silicon controlled rectifiers (not shown) may be employed if desired, the rectifiers having control (gate) electrodes respectively connected to the photoelectric cell 4 (or other sensor device) for triggering the controlled rectifiers into conduction in opposite directions on alternate half cycles.

Figure 3:
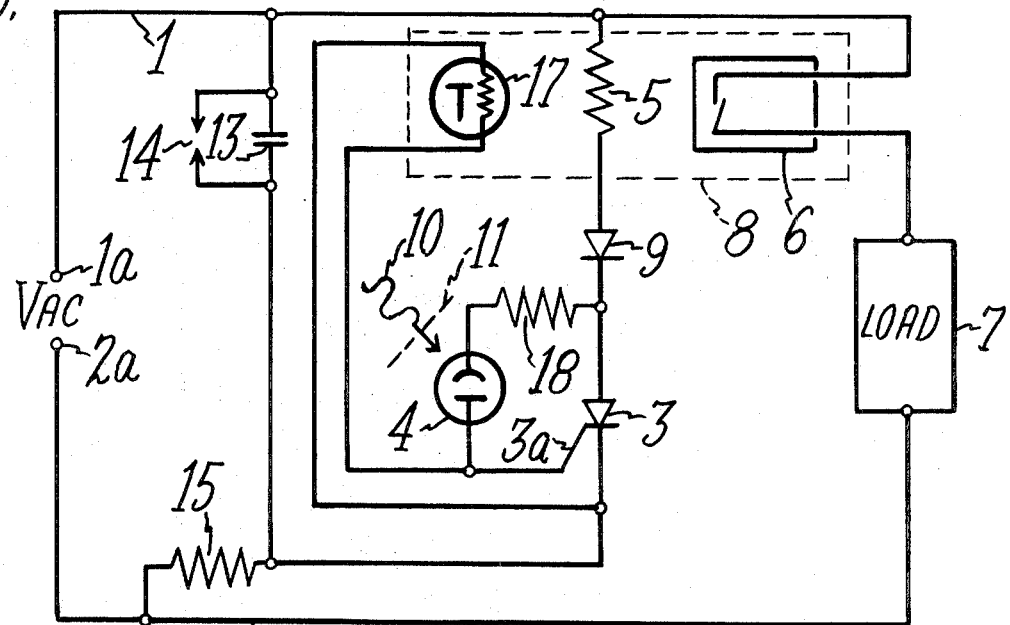
FIG. 3 shows an embodiment of the control circuit incorporating a temperature limiting control device.

FIG. 3 shows a modification of the FIG. 1 circuit which may be used with 120 to 240 volt or higher voltage power sources, and which incorporates means for limiting the maximum temperature to which the thermal elements of the circuit are heated. For this purpose, thermistor 17 or equivalent variable resistance means is connected in series with photoelectric cell 4 as shown and placed in proximity to heating resistor 5 in enclosure 8. As well understood in the art, the resistance of thermistor 17 decreases with an increase in temperature. As the heat produced by resistor 5 increases, thermistor 17 becomes increasingly conductive, thereby bypassing current from photoelectric cell 4 around control electrode 3a, thus requiring a higher applied voltage across SCR 3 to fire it. This results in retarding or preventing the firing of SCR 3, so that the current flowing to heating resistor 5 is limited or turned off. Thermistor 17 thus provides for phase control of the SCR operation or complete turnoff thereof for duty cycle control. In this way, the circuit elements are protected from excessive temperatures so that power sources of various voltages can be employed, and less expensive components having less resistance to high temperatures can be utilized.

Shown connected in series between diode 9 and photoelectric cell 4 is a current limiting resistor 18 which serves to limit power dissipation in photoelectric cell 4, particularly during phase controlled operation.

Figure 4:
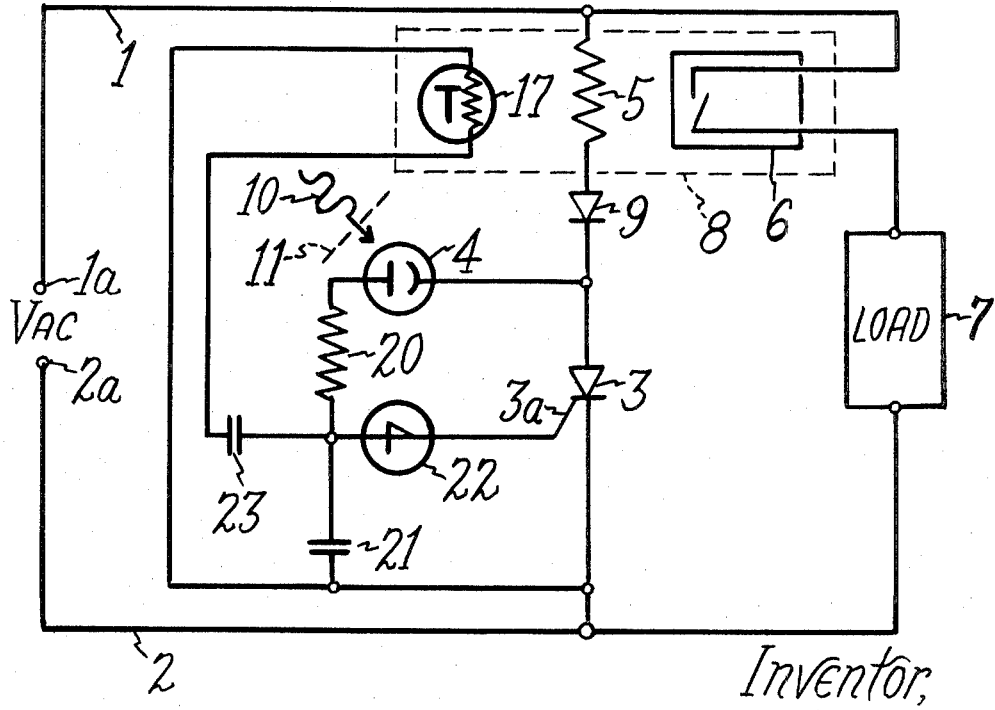
FIG. 4 is a modification of the FIG. 3 arrangement showing a different control circuit.

FIG. 4 shows a modified phase control arrangement used in conjunction with thermistor 17. This arrangement comprises resistance 20 arranged in series with photoelectric cell 4 and with a charging capacitor 21, all connected across SCR 3. A discharge loop for discharging capacitor 21 includes SCR control electrode 3a and a voltage sensitive switch device 22, such as a Shockley diode, which becomes conductive only upon the application of a predetermined voltage thereon. Other equivalent types of devices, such as a neon glow lamp, could be used for this purpose. Thermistor 17, arranged in thermal association with heating resistor 5, is connected in series with resistance 20 and across the described discharge loop. Arranged in series with thermistor 17 is capacitor 23 which provides linearity to the feedback function of the thermistor. In the operation of this arrangement, photoelectric cell 4 conducts current during daylight hours which passes through resistance 20 to charge capacitor 21, which discharges through Shockley diode 22 when the charge thereon reaches the breakdown level of the Shockley diode. The latter thereby applies a triggering signal to gage electrode 3a for switching on SCR 3 and passing current to heating resistor 5 for maintaining thermal switch 6 open, and luminaire 7 off, during daytime. When thermistor 17 becomes conductive due to excessive heat from resistance 5, current through thermistor 17 bypasses capacitor 21 and thus retards its charging, thereby delaying the firing of SCR 3 or turning it off and limiting the current applied to heating resistor 5. During the hours of darkness, photoelectric cell 4 is nonconductive and hence the charge on capacitor 21 does not reach the breakdown level of switch 22 necessary to turn on SCR 3.

Figure 5:
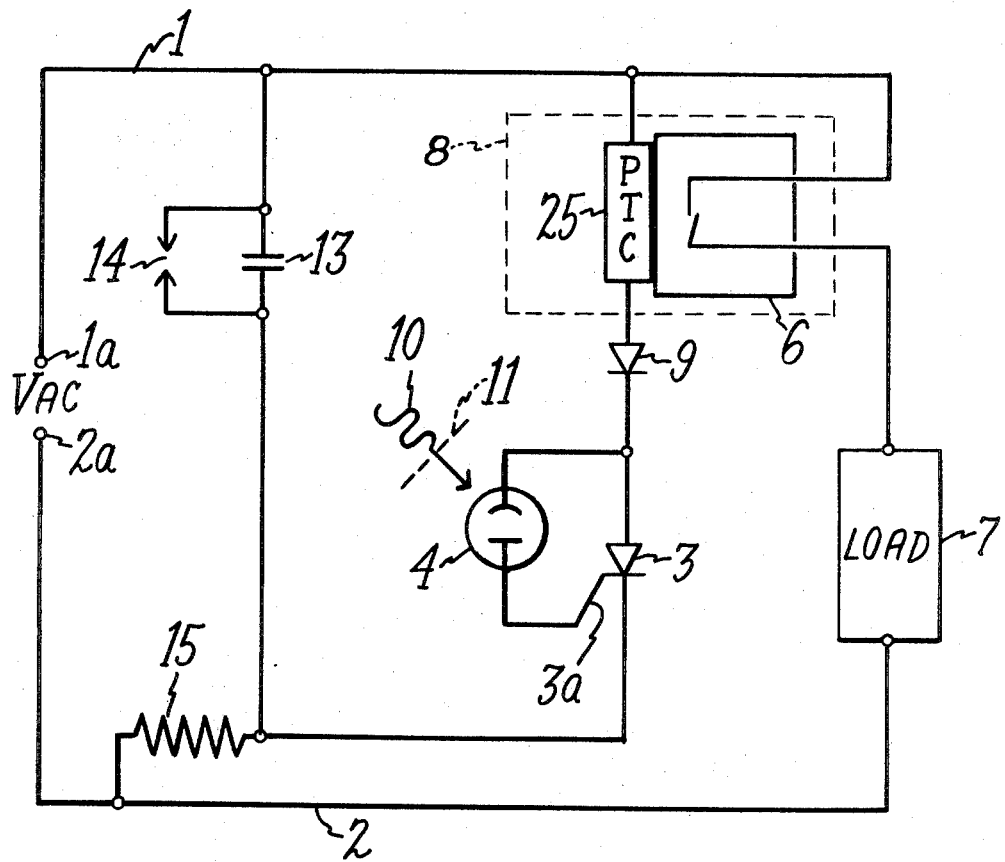
FIG. 5 shows a modified circuit incorporating a different type of temperature limiting device.

FIG. 5 shows a modified circuit arrangement embodying a self-temperature-limiting heating element 25 in place of heating resistor 5 shown in the above-described circuits. Element 25 is constituted by a temperature sensitive resistor (thermistor) which has a positive temperature coefficient (PTC), whereby it increases in resistance with an increase in temperature. As a result PTC element 25 functions as a combined heating resistance and as a protective self-temperature-limiting device, and accordingly serves the functions of both resistor 5 and thermistor 17 shown in the circuits of FIGS. 3 and 4. Such PTC thermistors are readily available commercially, and a particular type which has been found satisfactory for the purposes of the invention is in the form of a disk composed mainly of barium titanate. In a practical embodiment of the invention the PTC disk 25 is soldered or otherwise secured in direct thermal contact with the casing or cover of thermal switch 6 as shown in FIG. 5, and connected in series between diode 9 and supply conductor 1. In the operation of this arrangement, half-wave current flows through PTC element 25 when SCR 3 is turned on by the action of photoelectric cell 4. If the thermal switch is at ambient temperature, e.g. 25° C., the resistance of PTC element 25 is relatively low, e.g. 60 ohms, and the passage of current therethrough will rapidly start heating the PTC element. Thus, the lower the ambient temperature, the more rapid the heating of the PTC element. When the thermal switch 6 has reached a temperature of, say, 100° C., the switch activates and turns off the load in the manner previously described.

With increased heating, PTC element 25 increases its resistance and thereby limits the current passing therethrough thus limiting the operating temperature of the thermal switch and associated parts. In a typical case, a thermal equilibrium would be reached at a temperature of, say 120° C., which is above the actuating temperature of thermal switch 6. The PTC element 25 in association with the thermal switch 6 thus provides a self-correcting constant temperature system which compensates for opposite extremes in ambient temperature conditions. For example, when the circuit is in a hot luminaire, the heating watts contributed by the PTC element are automatically reduced; and, conversely, if the luminaire is subjected to very cold ambient temperature, the heating watts generated by the PTC element are automatically increased and due to its characteristics, results in rapid turn-on of the thermal switch even under severe cold conditions. A further advantage afforded by this system is that the circuit may be operated from supply sources of different voltages, since under higher voltages which might otherwise create excessive temperatures in the circuit components the PTC element, by increasing its resistance, tends to reduce the current and thereby the heat generated in the thermal system. Thus, the described circuit may find application in a dual voltage system of 120 and 240 volts or a varying voltage system.

The magnitude of resistor 15 in the FIG. 5 circuit is selected to provide a suitable surge and transient suppression function and to limit the initial peak current through SCR 3 at the lowest (cold) PTC element resistance.

As in the case of the previously described embodiments, the control circuit as used for luminaires is preferably so arranged that the temperature sensitive resistor 25 generates heat during the day but does not heat during the night, thus providing the benefit that the PTC element and associated thermal switch generate heat when the luminaire is off, and do not generate heat when the luminaire is on.

While the PTC element has been described herein as a resistor, it will be understood that other forms of devices including semiconductors may provide equivalent function, i.e. generate heat by the passage of current and have a positive temperature coefficient in respect to such characteristic, and accordingly all such devices are contemplated for use in accordance with the invention.

Although the invention has been described with reference particularly to its application to street lighting luminaires using a photoelectric detecting device, it will be understood that it may also have various other applications and employ types of sensing or detecting devices other than photoelectric cells, as appropriate for the particular application. Thus, a thermistor may be substituted for the photoelectric cell in an arrangement for controlling the operation of such devices as burners, ovens, motors, or other equipment in response to the operating temperature of such devices. Similarly, the described circuit could be adapted for controlling such environmental conditions as humidity, and for the latter purpose would employ a humidity sensitive, electrically conductive device as the sensing element. Other applications will readily occur to those skilled in the art.

Accordingly, while the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A control device for controlling the operation of a load comprising, in combination, electric current supply means, controlled semiconductor means connected across said electric current supply means and having a control electrode adapted to be actuated for rendering the controlled semiconductor means conductive to current from said supply means, sensing means connected in parallel with said controlled semiconductor means and connected to said supply means and to the control electrode of said controlled semiconductor means, said sensing means being operable to conduct current in response to predetermined conditions in its environment and thereby actuating said control electrode, and integrating switch means having a portion in series with said controlled semiconductor means for integrating the output of said controlled semiconductor means and having a portion across said supply means for operating the load in response to the output of said controlled semiconductor means.

2. A control device as defined in claim 1, wherein said controlled semiconductor means is a controlled rectifier.

3. A control device as defined in claim 1, wherein said controlled semiconductor means is a bidirectional controlled switch.

4. A control device as defined in claim 1, wherein said integrating switch means comprises heating resistance means and thermal switch means exposed to the heat produced by said heating resistance means for turning the load on and off in response to predetermined levels of such heat.

5. A control device as defined in claim 1, wherein said sensing means is a photoelectric cell operating in response to environmental light levels.

6. A control device for controlling the operation of a load comprising, in combination, electric current supply means, controlled semiconductor means connected across said electric current supply means and having a control electrode adapted to be actuated for rendering the controlled semiconductor means conductive to current from said supply means, sensing means connected in parallel with said controlled semiconductor means and connected to said supply means and to the control electrode of said controlled semiconductor means, said sensing means being operable to conduct current in response to predetermined conditions in its environment and thereby actuating said control electrode, and integrating switch means having a portion in series with said controlled semiconductor means for integrating the output of said controlled semiconductor means and having a portion across said supply means for operating the load in response to the output of said controlled semiconductor means, wherein said integrating switch means comprises heating resistance means and thermal switch means exposed to the heat produced by said heating resistance means for turning the load on and off in response to predetermined levels of such heat, and temperature sensitive variable resistance means arranged in proximity to said heating resistance means and connected between said sensing means and said supply means for limiting the heat produced by said heating resistance means.

7. A control device as defined in claim 6, said temperature sensitive variable resistance means comprising a thermistor.

8. A control device for controlling the operation of a load comprising, in combination, electric current supply means, controlled semiconductor means connected across said electric current supply means and having a control electrode adapted to be actuated for rendering the controlled semiconductor means conductive to current from said supply means, sensing means connected to said supply means and to the control electrode of said controlled semiconductor means, said sensing means being operable to conduct current in response to predetermined conditions in its environment and thereby actuating said control electrode, and integrating switch means in series with said controlled semiconductor means and said supply means for integrating the output of said controlled semiconductor means and for operating the load in response thereto, said integrating switch means comprising heating resistance means and thermal switch means exposed to the heat produced by said heating resistance means for turning the load on and off in response to predetermined levels of such heat, and temperature sensitive variable resistance means arranged in proximity to said heating resistance means and connected between said sensing means and said supply means for limiting the heat produced by said heating resistance means, said temperature sensitive variable resistance means comprising a thermistor, and phase control actuating means for controlling the operation of said controlled semiconductor means in response to the operation of said thermistor comprising a resistor and a charging capacitor connected in series with said sensing means, voltage sensitive-switch means having a predetermined voltage breakdown level connected in series with said control electrode and said charging capacitor and forming therewith a discharge loop for discharging said capacitor, said thermistor being connected across said discharge loop.

9. A control device for controlling the operation of a load comprising, in combination, electric current supply means, controlled semiconductor means connected across said electric current supply means and having a control electrode adapted to be actuated for rendering the controlled semiconductor means conductive to current from said supply means, sensing means connected in parallel with said controlled semiconductor means and connected to said supply means and to the control electrode of said controlled semiconductor means, said sensing means being operable to conduct current in response to predetermined conditions in its environment and thereby actuating said control electrode, and integrating switch means having a portion in series with said controlled semiconductor means for integrating the output of said controlled semiconductor means and having a portion across said supply means for operating the load in response to the output of said controlled semiconductor means, wherein said integrating switch means comprises heating resistance means and thermal switch means exposed to the heat produced by said heating resistance means for turning the load on and off in response to predetermined levels of such heat, wherein said heating resistance means comprises a temperature sensitive variable resistor having a positive temperature coefficient whereby is resistance increases with an increase in temperature and decreases with a decrease in temperature, so as to limit the heat produced thereby and to accelerate its generation of heat under low ambient temperature conditions.

10. A control device as defined in claim 9, said variable resistor being connected in series with said controlled semiconductor means and said supply means and being in thermal contact with said thermal switch means, and means for connecting said thermal switch means in series with the load and said supply means.

11. A control device as defined in claim 10, wherein said thermal switch means comprises a pair of contacts which are normally closed when said variable resistor is in nonoperative cool condition, and which are normally open when said variable resistor is in operative, heat-generating condition.

* * * * *